United States Patent
Laurila et al.

(10) Patent No.: US 9,584,604 B2
(45) Date of Patent: Feb. 28, 2017

(54) UTILIZATION OF SUBSCRIBER DATA IN A TELECOMMUNICATION SYSTEM

(75) Inventors: Pasi Laurila, Tupos (FI); Juha Timonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 831 days.

(21) Appl. No.: 10/082,348

(22) Filed: Feb. 26, 2002

(65) Prior Publication Data

US 2002/0116384 A1    Aug. 22, 2002

Related U.S. Application Data (63) Continuation of application No. PCT/FI00/00735, filed on Aug. 30, 2000.

(30) Foreign Application Priority Data

Aug. 31, 1999 (FI) ..................... 19991847

(51) Int. Cl.
   H04W 8/12    (2009.01)
   H04W 12/06   (2009.01)
   H04L 29/08   (2006.01)
   H04L 29/06   (2006.01)
   H04W 8/18    (2009.01)

(52) U.S. Cl.
   CPC .......... *H04L 67/16* (2013.01); *H04L 63/0853* (2013.01); *H04L 67/04* (2013.01); *H04W 8/12* (2013.01); *H04W 8/18* (2013.01); *H04W 12/06* (2013.01)

(58) Field of Classification Search
   CPC .......... H04M 11/00; H04M 3/00; H04Q 7/20
   USPC .......... 455/410, 411, 432.1, 433, 435.1, 558, 455/433.1, 432.3, 440, 432, 418, 419, 420
   See application file for complete search history.

(56) References Cited

U.S. PATENT DOCUMENTS

| | | |
|---|---|---|
| 5,566,235 A | 10/1996 | Hetz |
| 5,920,820 A | 7/1999 | Qureshi et al. |
| 5,943,619 A | 8/1999 | Coyne et al. |
| 6,272,129 B1 * | 8/2001 | Dynarski et al. ............. 370/356 |
| 6,311,055 B1 * | 10/2001 | Boltz ........................ 455/414.1 |

(Continued)

FOREIGN PATENT DOCUMENTS

| | | | |
|---|---|---|---|
| GB | 2 293 946 | 4/1996 | |
| GB | 2308039 A * | 6/1997 | .............. H04M 3/42 |

(Continued)

OTHER PUBLICATIONS

Ojanpera et al. "WIdeband CDMA for the Third Generation Mobile Communications," 1998, Artech House, Boston, MA, pp. 343-356, 368-372, 375-380.

*Primary Examiner* — Khawar Iqbal
(74) *Attorney, Agent, or Firm* — Harrington & Smith (57) ABSTRACT

A method of providing telecommunication services in a telecommunication system including a terminal, a serving network providing the terminal with services, and a bearer network in functional connection with the serving network. One or more databases including subscriber data are created in the telecommunication system, the subscriber database(s) being in functional connection with the bearer network. Data according to the subscriber database, such as a subscriber identifier, are transmitted to the serving network and/or the terminal. The terminal is provided with services in accordance with the transmitted subscriber data.

35 Claims, 3 Drawing Sheets

(56) References Cited

U.S. PATENT DOCUMENTS

| | | | | |
|---|---|---|---|---|
| 6,427,076 B2* | 7/2002 | Skog | | 455/433 |
| 6,466,571 B1* | 10/2002 | Dynarski et al. | | 370/352 |
| 6,466,964 B1* | 10/2002 | Leung et al. | | 709/202 |
| 6,501,746 B1* | 12/2002 | Leung | | 370/338 |
| 6,515,997 B1* | 2/2003 | Feltner et al. | | 370/401 |
| 6,519,458 B2* | 2/2003 | Oh et al. | | 455/445 |
| 6,549,776 B1* | 4/2003 | Joong | | 455/433 |
| 6,578,085 B1* | 6/2003 | Khalil et al. | | 709/241 |
| 6,587,684 B1* | 7/2003 | Hsu et al. | | 455/419 |
| 6,594,488 B1* | 7/2003 | Chow et al. | | 455/426.1 |
| 6,683,881 B1* | 1/2004 | Mijares et al. | | 370/401 |
| 6,697,354 B1* | 2/2004 | Borella et al. | | 370/352 |
| 6,697,355 B1* | 2/2004 | Lim | | 370/352 |
| 6,731,621 B1* | 5/2004 | Mizutani et al. | | 370/338 |
| 6,735,429 B1* | 5/2004 | Adamany et al. | | 455/410 |
| 6,751,459 B1* | 6/2004 | Lee et al. | | 455/445 |
| 6,760,444 B1* | 7/2004 | Leung | | 380/270 |
| 6,775,262 B1* | 8/2004 | Skog et al. | | 370/349 |
| 7,281,133 B2* | 10/2007 | Ginter | | G06F 21/6209 348/E5.006 |
| 7,457,782 B2* | 11/2008 | Nakajima | | G06Q 20/02 705/72 |
| 8,793,165 B1* | 7/2014 | Mussman | | G06Q 30/02 705/14.4 |
| 2001/0014615 A1* | 8/2001 | Dahm | | G06F 3/0237 455/566 |
| 2002/0042841 A1* | 4/2002 | Nishio et al. | | 709/245 |
| 2002/0160790 A1* | 10/2002 | Schwartz | | G06F 3/0237 455/456.1 |
| 2002/0187777 A1* | 12/2002 | Osterhout | | H04M 3/54 455/417 |
| 2003/0039237 A1* | 2/2003 | Forslow | | 370/352 |
| 2003/0211845 A1* | 11/2003 | Lohtia | | H04L 12/1859 455/414.3 |
| 2004/0116132 A1* | 6/2004 | Hunzinger et al. | | 455/456.1 |
| 2004/0184420 A1* | 9/2004 | Xu | | H04L 45/58 370/328 |
| 2004/0248570 A1* | 12/2004 | Denenberg et al. | | 455/432.3 |
| 2005/0003805 A1* | 1/2005 | Zaffino | | H04L 29/06 455/414.1 |
| 2007/0037569 A1* | 2/2007 | McNiff | | H04W 8/02 455/422.1 |
| 2009/0271512 A1* | 10/2009 | Jorgensen | | H04L 1/20 709/224 |
| 2014/0108253 A1* | 4/2014 | Hartmaier | | G06Q 20/04 705/44 |
| 2014/0304154 A1* | 10/2014 | Levchin | | G06Q 20/02 705/41 |

FOREIGN PATENT DOCUMENTS

| | | |
|---|---|---|
| WO | WO 95/07009 | 3/1995 |
| WO | WO 97/25828 | 7/1997 |
| WO | WO 98/37114 | 8/1998 |
| WO | WO 99/26428 | 5/1999 |
| WO | WO 99/35794 | 7/1999 |

* cited by examiner

UTILIZATION OF SUBSCRIBER DATA IN A TELECOMMUNICATION SYSTEM

This is a Continuation of International Application PCT/FI00/00735 filed Aug. 30, 2000 which designated the U.S. and was published under PCT Article 21(2) in English.

BACKGROUND OF THE INVENTION

The invention relates to a method of providing telecommunication services in a telecommunication system comprising at least one terminal, a serving network providing the terminal with services, and at least one bearer network in functional connection with the serving network, the connection between the serving network and the terminal being established by means of a subscriber application comprised by the terminal.

The invention also relates to a telecommunication system comprising at least one terminal, a serving network providing the terminal with services, and at least one bearer network in functional connection with the serving network, the connection between the serving network and the terminal being established by means of a subscriber application comprised by the terminal.

The invention further relates to a network element in a telecommunication system, which network element is arranged to provide a telecommunication connection for a terminal by means of a subscriber application comprised by the terminal.

In various telecommunication systems, various subscriber or service data are often used for several purposes. Typically, a terminal utilizing telecommunication resources has to transmit its identifier to the telecommunication network, so that it can be distinguished from other terminals. Further, on the basis of the identifier, services of a certain quality level (QoS, Quality of Service) may be provided for the terminal in question. Also, various applications are required to identify a subscriber in a telecommunication system. Various smart-card based subscriber identification applications are widely used in telecommunication systems, especially in mobile systems, on the basis of which applications the subscriber can be identified and provided with services according to the subscriber agreement.

Third generation mobile communication systems have been developed in different parts of the world. The 3GPP ($3^{rd}$ Generation Partnership Ship Project) is in the process of standardizing the third generation mobile system UMTS (Universal Mobile Telecommunications System) based on the GSM system and comprising a new radio interface. The UMTS radio interface will be based on at least the WCDMA (Wideband Code Division Multiple Access) technology. The UMTS system will utilize the GSM core network, whereby connection management and mobility management will probably be to a great extent similar. The UMTS system will provide circuit-switched and packet-switched services. Packet-switched services will probably be based on the GPRS service (General Packet Radio Service) of the GSM.

All services of the UTMS system will not be standardized. The standardization will only concern certain basic services, whereby different mobile communication services and applications implementing these services can be developed, in which these basic services are utilized. It is therefore to be expected that, compared with the second generation mobile communication systems, the provision of services will increase considerably and new service providers will come onto the market.

To prevent misuse and to ensure reliable billing, in particular, subscriber identification is typically arranged in telecommunication systems, such as in the UMTS system. Before being able to use the services provided by the UMTS system, the subscriber has to make an agreement with the UMTS service provider. While a distinction can often be made between the user and the subscriber in telecommunication systems, in the present application it is assumed, for the sake of simplicity, that the subscriber is also the user.

In the UMTS specifications, the UMTS service provider corresponds to the home environment HE known as the home environment HE, which makes an agreement with the subscriber about the provision of services and gives the subscriber an identification application USIM (UMTS Subscriber Identity Module). Hereby, the home location register HLR comprising subscriber data is typically located in the home environment HE. The serving network SN refers to the network in the area of which the mobile station is at a given moment. In roaming and when the provision of services and the network operation are separate, the home environment HE and the serving network SN may be different. It is thus feasible that the home environment HE buys bearer services from the serving network SN.

The USIM application is usually stored on a smart card UICC (UMTS IC Card). The home environment HE owns the USIM application and typically also the smart card UICC. The services can only be used in the mobile network when the mobile station has the USIM available, an emergency call being the only exception. The USIM comprises the data required for the identification of the subscriber, such as a subscriber identifier IMSI (International Mobile Subscriber Identity). In some specifications, the identifier corresponding to the IMSI is IMUI (International Mobile User Identity). Typically, a temporary identifier TMSI (Temporary Mobile Subscriber Identity) specific to the current location area is also stored in the USIM application, by means of which identifier the transmission of the IMSI over the radio path can be avoided.

The USIM comprises authentication functions to authenticate the subscriber-representing USIM application in the network. The calculation of the cipher key is also performed in the USIM application. The verification of the subscriber is arranged at least by means of a PIN identifier (Personal Identity Number), whereby the USIM application may only be utilized by the user who knows the number. The USIM comprises data relating to the services and information about the location area, for example, updated by the serving network. The USIM application also contains memory for the subscriber's personal data; telephone numbers and short messages, for instance, can be stored in the USIM application.

The subscriber may need to make agreements with more than one home environment HE. For example, the subscriber may want to use a mobile network providing the most inexpensive services at a given time. As the USIM always belongs to one home environment HE, the subscriber now receives several USIM applications that may be on different smart cards. Typically, changing the USIM application to be used will also change the mobile network providing the radio connection.

Figure 1:
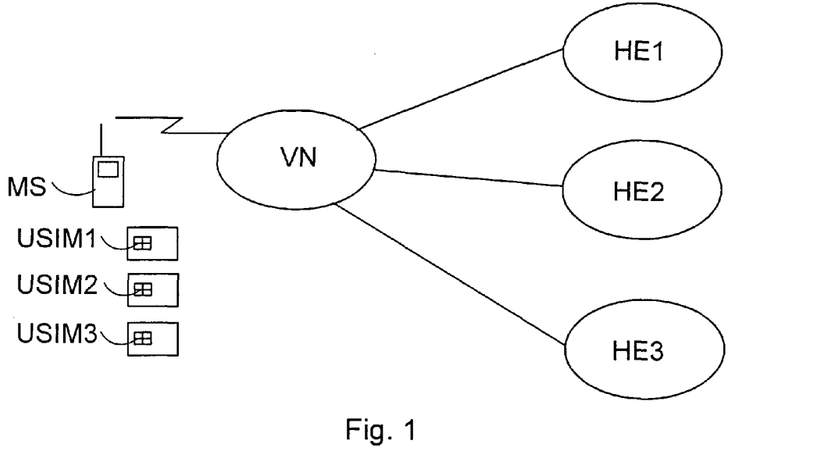

It is also possible to use services of several different home environments through one serving network SN. The precondition for this is that the home environments have agreed to purchase network services from the serving network. FIG. 1 illustrates a telecommunication system in which a mobile station MS may be in connection with several home environments HEI, HE2, HE3 through one serving network VN.

As subscriber identification applications are required for the use of each home environment HE, the subscriber needs three identification applications USIM1, USIM2 and USIM3.

In the UMTS system, one UICC card may contain several separate applications, such as USIM applications. If the mobile station supports substantially simultaneous use of several USIM applications, it may be possible to use several mobile communication services from different home environments. In phase 1 of the UMTS system, however, support is not required for the use of more than one USIM application.

A problem with the arrangement described above is the use or updating of subscriber identification applications, such as USIM applications, comprised by a terminal, especially a mobile station. The memory of a smart card is typically very limited and it is not possible to store large amounts of data on it. Modifying the memory of a smart card is difficult for the owner of the application, especially when operating over a radio connection, whereby the possibility of errors increases compared with a situation where a fixed line is used. Further, the connection between the smart card and the terminal may be slow for transmitting large amounts of data.

Using more than one identification application in a terminal may be difficult for the user, especially when the applications are on different smart cards. The terminal must also comprise means for supporting several subscriber identification applications substantially simultaneously and possibly on different smart cards, which adds to the complexity of the terminal.

When a smart card contains identification applications of several operators, it becomes problematic to guarantee security between different applications, and ownership and responsibility questions may also arise.

If identification applications belonging to several different owners, such as mobile station operators, are simultaneously used in a terminal, control signalling, such as location updating, is typically required for all applications separately. Hereby, the increase in signalling over the radio path in mobile systems causes a further problem.

BRIEF DESCRIPTION OF THE INVENTION

An object of the invention is thus to provide a method and equipment implementing the method in order to avoid the above problems. The objects of the invention are achieved by a method, a system and a network element characterized by what is disclosed in the independent claims. Preferred embodiments of the invention are disclosed in the dependent claims.

The invention is based on the idea that subscriber data typically comprised by a terminal are stored in a network. Different subscriber data may be used by means of one subscriber application in the terminal. Hereby, at least one database comprising subscriber data is created, which database is in functional connection with the bearer network. The subscriber database may include various data that can be required when telecommunication or value-added services are used in the terminal, the serving network or the bearer network.

The connection between the terminal and the serving network is arranged by means of a subscriber application, such as a USIM application, comprised by the terminal. A connection is established from the terminal to the subscriber database, preferably on the basis of an address transmitted by the terminal. The precondition for the use of the subscriber database may be the identification of the subscriber. Subscriber data are transmitted from the subscriber database and/or the bearer network to the serving network and/or the terminal. Part of the subscriber data to be transmitted may originate from a subscriber database and part from a subscriber register of the bearer network, such as the home location register HLR. The transmitted subscriber data are used in providing services to the terminal and they may also comprise applications. Its features permitting, the serving network is preferably arranged to provide services for the terminal in accordance with the transmitted subscriber data.

According to a preferred embodiment of the invention, the subscriber data to be transmitted comprise a subscriber identifier. The serving network may be arranged to direct data directed to the subscriber of the subscriber database to the terminal identified by the subscriber application. In connections directed outside the serving network, the terminal (subscriber) is identified on the basis of the subscriber identifier of the subscriber database.

Further, according to a preferred embodiment of the invention, location information about the terminal is transmitted to the bearer network or networks, which information includes at least the network serving the terminal at each particular time. Hence, the bearer network may transmit the service requests directed to a subscriber to the correct serving network.

If several subscriber databases are used, the terminal may, according to a preferred embodiment, transmit information about the subscriber database to be used, in connection with a service request of connection establishment, for instance.

Also, according to a preferred embodiment of the invention, the subscriber database comprises information about the services to be provided, and/or the subscriber's personal data. According to still another preferred embodiment of the invention, the terminal (especially the subscriber) and/or the bearer network may, when needed, modify the subscriber data of the subscriber database preferably in accordance with the access rights of the subscriber database.

An advantage of the invention is that subscriber data in different networks may be used instead of separate subscriber applications comprised by the terminal. Through a serving network providing a telecommunication connection, different subscriber data and services of various service providers may be used by means of one subscriber application of the serving network in the terminal. By means of the subscriber database in the network, an identity may be provided for the terminal, by means of which it gains access to other telecommunication networks, such as to a mobile network of another operator or to an internal network of a company.

The bearer network of the subscriber database, such as a mobile station operator, may easily change the subscriber data in the network, when needed, and the storing capacity is not as limited as that of a smart card.

The terminal may use the data in the subscriber database and the services according to the subscriber database without any bearer network-specific application in the terminal. Hereby, problems relating to the use of several subscriber applications and/or smart cards in the terminal and security problems may be avoided. If several subscriber databases available in the network are used, it is not, according to the invention, necessary to transmit several control signals from the terminal, for location updating, for example, and thus the amount of the data to be transmitted between the terminal and the serving network decreases. Hereby, the consumption of radio resources in mobile communication systems can be reduced.

BRIEF DESCRIPTION OF THE DRAWINGS

The will now be described in greater detail in connection with preferred embodiments, with reference to the attached drawings, of which FIG. 1 generally illustrates a telecommunication system.

DETAILED DESCRIPTION OF THE INVENTION

The invention may be applied to any telecommunication system in which a subscriber identification application or the like is used. The invention may also be applied to telecommunication systems that do no not use smart cards, such as smart cards comprising a SIM application. An example of such a mobile communication system is a PDC (Personal Digital Cellular) system. In the following, the invention is described as applied to the UMTS mobile communication system, for which the invention is particularly suitable.

Figure 2:
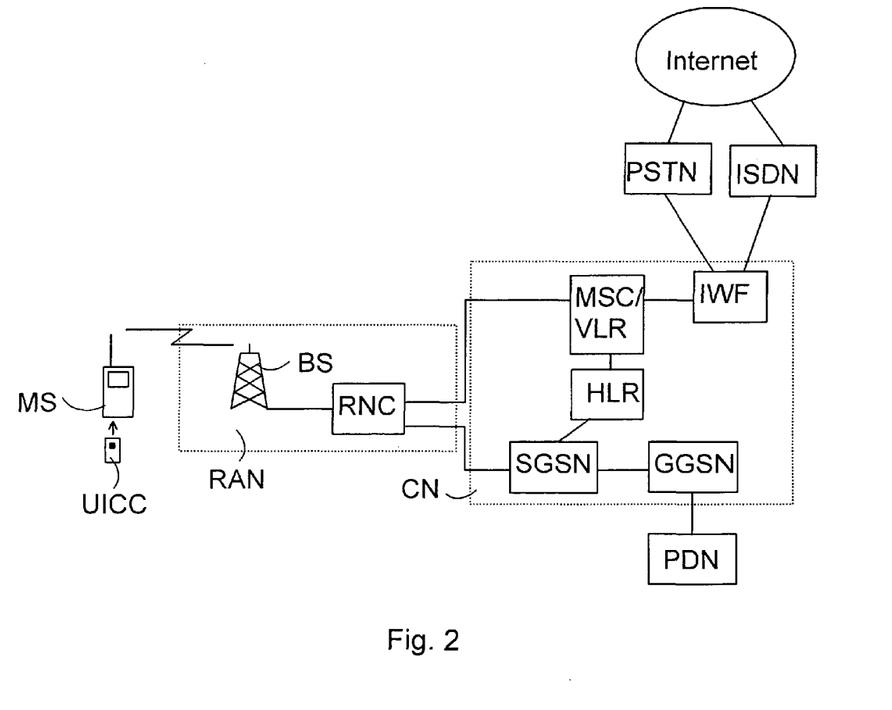
FIG. 2 illustrates a UMTS mobile communication system.

FIG. 2 shows, by way of example, a mobile network according to the UMTS system, the core network CN of said network being based on the GSM system. The UMTS mobile station MS comprises mobile equipment ME and a UICC smart card. The radio access network RAN of the UMTS base station system comprises one or more base stations BS, the available radio frequencies and channels of which are controlled by the radio network controller RNC.

For the circuit-switched services, the radio network controllers RNC are connected to a mobile switching centre MSC/VLR, which attends to the connection establishment of circuit-switched services and the routing to the correct addresses. Here, two registers are utilized, which comprise data about mobile station subscribers, i.e. a home location register HLR and a visitor location register VLR. Typically, the visitor location register VLR is implemented as a part of the mobile switching centre MSC/VLR. Correspondingly, for packet-switched services, a serving GPRS support node SGSN is available, which utilizes the home location register HLR.

The mobile switching centre MSC/VLR is, through an interworking function IWF, in connection with other telecommunication networks, such as the public switched telephone network PSTN and the integrated services digital network ISDN. A gateway GPRS support node GGSN attends to the connections to packet data networks PDN. Furthermore, in FIG. 2 the ISDN and PSTN networks have a connection to the Internet.

In subscriber authentication, a random number parameter, an authentication response parameter XRES (Expected Response) and a cipher key CK are calculated for the USIM application representing the subscriber in question, typically in an authentication centre located in connection with the home location register HLR. The random number parameter is transmitted to the USIM application. The USIM transmits the calculated XRES parameter to the visitor location register VLR in the network, and the VLR compares this parameter with the XRES parameter received from the authentication centre. The authentication is successful if the XRES parameter calculated in the network and the XRES parameter calculated in the USIM application correspond to each other. For a more detailed description of the UTMS system, reference is made to the 3GPP UMTS specifications.

Figure 3:
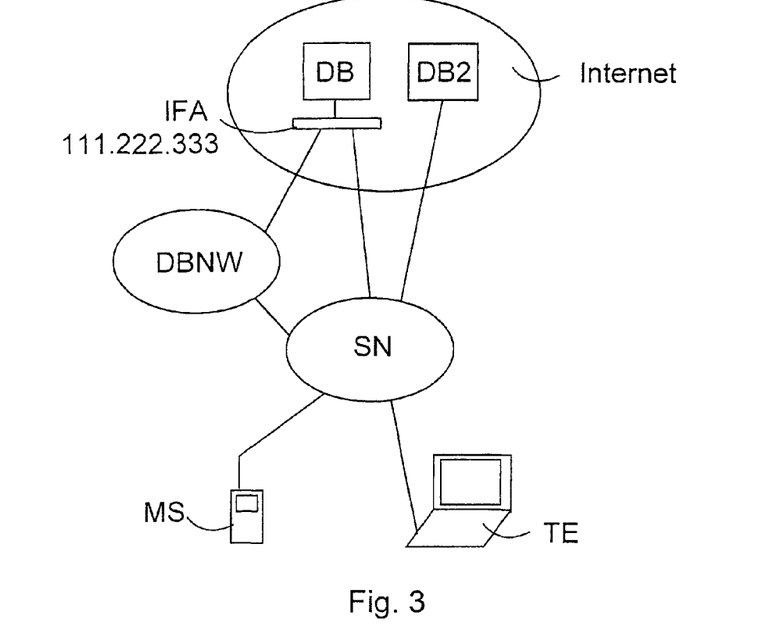
FIG. 3 generally illustrates an arrangement according to the invention for implementing subscriber databases in a network.

FIG. 3 illustrates an arrangement according to the invention. According to an essential idea of the invention, one or more subscriber databases DB, DB2 are created in a telecommunication system. The subscriber database DB may, in principle, comprise any data which the terminal MS, TE or a telecommunication network SN in connection with the terminal may need when telecommunication or value-added services are used. For example, links to the services of a service provider may be stored in the subscriber database. The subscriber database DB may comprise applications, different subscriber profiles, the subscriber's personal data, subscriber identifiers and other data relating to the services provided. Hence, the data in the DB may also comprise various functions, such as ciphering functions. The DB is preferably located in a telecommunication network connected to the Internet, whereby a connection thereto may be established irrespective of the geographical area. Part of the data relating to the subscriber database DB may be stored in its bearer network DBNW, from which data can be used when needed.

Compared with known subscriber identification applications on smart cards, such as the USIM application, a considerable advantage of a subscriber database DB in a network is that the amount of the data to be stored is not so limited. Also, the DB differs from known registers comprising network subscriber data, such as from the home register in a mobile network, in that the data can be modified and read by the subscriber.

The subscriber database DB comprises different data, which are processed by means of an interface application IFA relating to said subscriber database. The IFA comprises a network address, preferably an Internet address, for using the subscriber database. In the present application, the subscriber database DB also comprises an application for data processing.

The terminal is in connection with a serving network SN, such as the UMTS network shown in FIG. 2, by means of a subscriber application comprised by the terminal, such as the USIM application. Preferably, a connection is established to the subscriber database DB located in the network by means of an IP (Internet Protocol) address (111.222.333). The terminal may be in data transmission connection with the subscriber databases DB, DB2 of several different networks. The subscriber database DB identifies the subscriber, and, the identification being successful, enables the use of the subscriber database. For instance, different IN (Intelligent Network) services of the DB bearer network DBNW may be used by means of the subscriber database DB.

Different service providers may thus provide services without service provider specific subscriber applications and/or smart cards in the terminal; typically, however, at least one network specific subscriber application is required in the terminal to establish the network connection. The subscriber database DB in the network enables the subscriber to have several identifiers, i.e. identities, allowing the use of services of different service providers, in particular. However, the use of the identities requires no separate identification applications or smart cards in the terminal, as the address of the subscriber database DB in the network is sufficient. Hereby, problems relating to the use and security of different applications on the same smart card can be avoided.

According to a preferred embodiment of the invention, the subscriber database DB comprises data that are at least partly the same as in a subscriber application in a mobile station, such as the USIM application. In other words, the DB may comprise the same data as the USIM, but the DB is not stored on the smart card. Operation on the applicational level between the subscriber database DB and the mobile station MS can be implemented in substantially the same way as between the USIM application on a smart card and the mobile station. This allows the same commands and file specifications to be used without any need for extensive changes to the mobile station. The operation on the physical transmission level is naturally different and may be implemented using a wireless application protocol WAP, for example.

If the subscriber database DB comprises the same data as the USIM application, several virtual USIM applications located in different networks for providing telecommunication services may preferably be used. This allows the user of the mobile station to use several different home environments, but the connection to these networks can only be established by means of one USIM application in the mobile station and one serving network. Hereby, the DB can be authenticated, for instance. Especially the updating of the data in the subscriber database DB is considerably easier and more reliable for the owner of the subscriber database than it would be with subscriber applications of a mobile station that would have to be updated over the radio interface.

According to a preferred embodiment of the invention, WAP technology is used to communicate with the subscriber database DB having an Internet address. The WAP is a standard developed for wireless systems, which enables flexible use of different Internet applications in mobile stations. In particular, the WAP enables optimized transmission of the WWW contents to a mobile station. The WAP defines various components, by means of which the WWW server and the mobile station can communicate safely. According to the WAP standard, the WAP gateway comprises a functionality (proxy technology) for converting the contents in the HTML format (Hypertext Mark-up Language) to a format according to WML (Wireless Mark-up Language) optimized for the mobile station, and vice versa. Further, requests according to the WAP protocol from the mobile station are converted by the WAP gateway into WWW requests. WAP protocols may be used by means of different network services, for example by using short messages or packet-switched or circuit-switched data connections. Typically, a connection is established through an Internet access point to the WAP gateway. When the connection is established to the WAP gateway, the WML protocol and language can be used between the WAP application and the gateway. A connection to the WWW server is established from the WAP gateway by means of a URL (Uniform Resource Locator) address.

Figure 4:
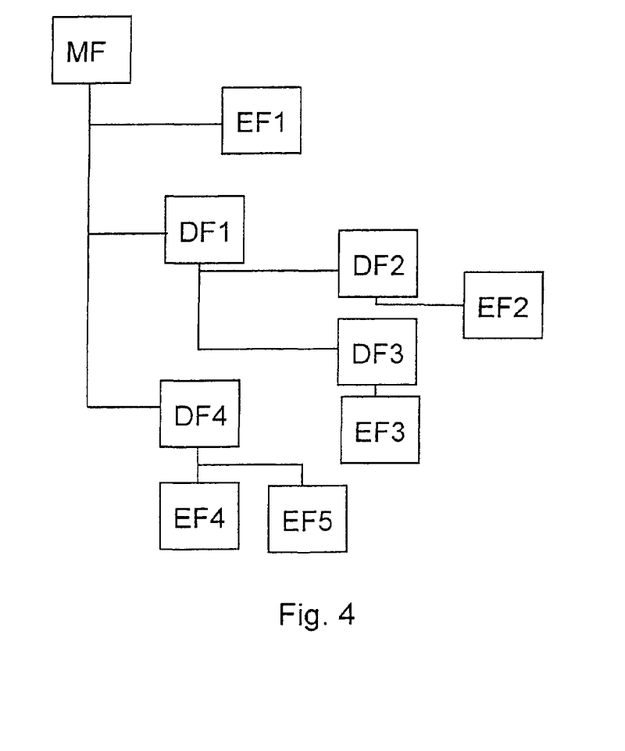
FIG 4. illustrates, by way of example, a directory structure of a subscriber database in the network.

The data in the subscriber database DB are preferably divided into different files. The file structure of the subscriber database DB is illustrated by way of example in FIG. 4. Typically, the files on smart cards are divided into three categories: master files MF, dedicated files DF1-4 and elementary files EF1-5. The rest of the files are located under the master file MF, which comprises conditions for access to the files. Access to the data is achieved through the master file MF when the set conditions are fulfilled. The dedicated files correspond to directories and may comprise other dedicated files, or elementary files. The elementary files comprise data. The elementary and dedicated files may have different access rights. A file arrangement corresponding to that used on smart cards may also be used in the subscriber database DB.

The data in the subscriber database DB are preferably divided according to different access rights; in other words, part of the data are such that the subscriber cannot modify them. In the file structure shown in FIG. 4, the files may be divided in such a way, for instance, that both the subscriber and the owner of the subscriber database have rights to the files DF1, DF2, EF2, DF3 and EF3. Only the subscriber has the right to the files DF4, EF4 and EF5, while only the owner has the right to modify the file EF1. Further, the terminal may have rights to certain files in the subscriber database. The access rights may further be divided into read-only rights and writing rights.

Figure 5:
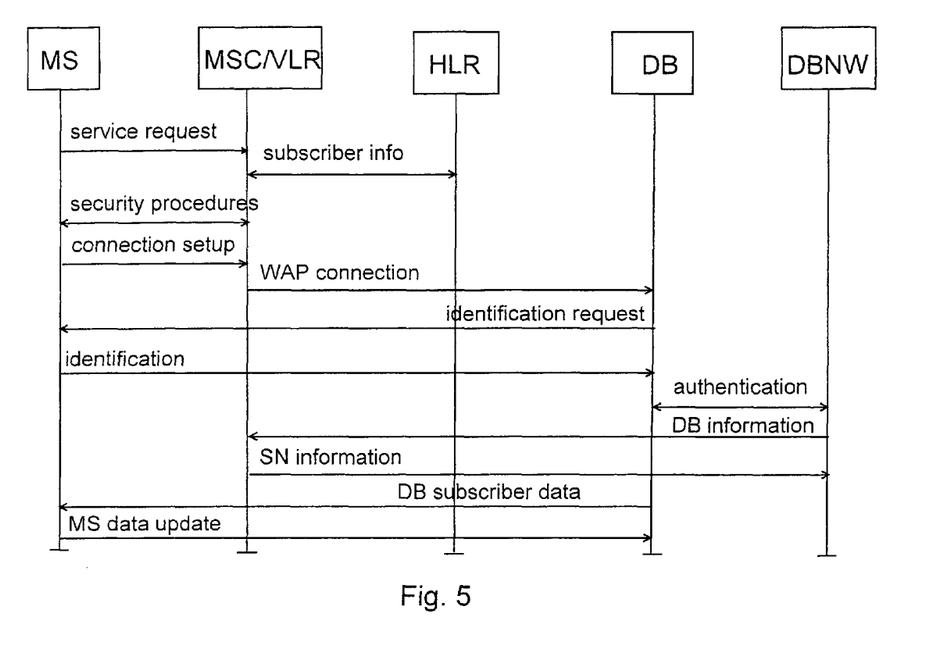
FIG. 5 illustrates, by way of example, activation and use of a subscriber database in the network by means of a signalling diagram.

In the following, FIG. 5 shows, by way of example, the activation and use of a subscriber database DB through a mobile switching centre MSC/VLR. It is obvious that the invention may also be applied to GPRS networks providing packet-switched services, whereby the subscriber database DB in the network may be used by means of the serving GPRS support node SGSN.

The mobile station MS may be activated in the serving network SN by means of a USIM application in accordance with prior art. The user of the mobile station MS wishes to activate the subscriber database DB in the network to make a call, for example. A signalling connection is established between the mobile station MS and the base station system of the serving network SN in accordance with prior art (not shown). The mobile station searches the USIM application for an IMSI or TMSI subscriber identifier.

The mobile station MS transmits a connection establishment request (service request) to the mobile switching centre MSC/VLR of the serving network SN on the allocated signalling channel. The connection establishment request may preferably comprise information about the use of another subscriber identifier, on the basis of which the mobile switching centre MSC/VLR of the serving network detects that the IMSI of the USIM application is not final. The connection establishment request may comprise a bit, for example, on the basis of which the MSC/VLR detects that another subscriber identifier is to be activated.

On the basis of the subscriber identifier (TMSI or IMSI) transmitted in the connection establishment request, the MSC/VLR receives subscriber data, such as an authentication response and a cipher key, from the home location register HLR of the USIM application when needed (subscriber info). Once the MSC/VLR has received the subscriber data required, the connection to the HLR may be disconnected. In case of any calls directed to the subscriber, the subscriber data in the HLR are preferably set to inform that the subscriber of the USIM application is not in service.

The subscriber may be authenticated by comparing the authentication responses (XRES). The IMEI (International Mobile Equipment Identity) identifier of the mobile station can then be checked and traffic encryption started (security procedures). Now the connection to the serving network is protected and connection establishment to the subscriber database DB can be started.

The MSC/VLR may set a time limit for the connection to the subscriber database DB. The time limit is preferably set when the MSC/VLR detects, on the basis of the connection establishment request, that another subscriber identity is to be activated. The MSC/VLR disconnects the telecommunication connection from the mobile station MS if the duration of the telecommunication connection to the subscriber database DB exceeds the defined time limit. The serving network SN is thus easily able to control the connections and preferably only allow the connections to the subscriber database DB network. The serving network SN may also preferably change the time limit when needed; for example, when the network is loaded, the time limit may be shorter than it would be if there were a lot of capacity in the network. The time limit can be removed when the MSC/VLR receives a confirmation that the subscriber database DB is being used. Hereby, the MSC/VLR can confirm that it will be paid for the use of the telecommunication connection.

The mobile station MS sends a connection set-up message to the serving network SN. The connection set-up message (connection setup) typically comprises for example the number to be called and information about the telecommunication services required by the mobile station MS. In a solution according to a preferred embodiment of the invention, the connection to the subscriber database DB is established by means of the WAP technology, whereby the connection set-up message comprises the service request and data required to establish a WAP connection. Typically, the addresses of the Internet access point and the WAP gateway are required to establish a WAP connection. It is recommendable to establish the WAP connection between the subscriber database DB and the mobile station by using a fast network connection, such as an HSCSD (High Speed Circuit Switched Data) connection, over the radio interface, so that the delays in the provision of services will not get long. It is obvious that the connection to the subscriber database DB can also be set up by other technologies, such as the MExE (Mobile Station Application Execution Environment) technology.

A request is transmitted from the mobile switching centre MSC/VLR to the WAP gateway, whereby a WAP connection may be activated between the mobile station and the gateway. For the sake of clarity, the WAP gateway is not included in FIG. 5.

Further, the IP address of the subscriber database DB is transmitted from the mobile station. The address is preferably stored in the mobile station MS or in the USIM application therein. It may also be fed by the subscriber himself/herself. The address of the subscriber database DB may also be transmitted in the connection set-up message or after the WAP connection has been established to the WAP gateway. A connection from the WAP gateway through the Internet to the subscriber database DB may be established on the basis of the IP address transmitted by the mobile station MS according to the WAP and IP technologies known per se (WAP connection).

The subscriber database DB receives a connection establishment request, whereby it preferably checks that the mobile station has a right to use the subscriber database. The DB then transmits a subscriber identification request to the mobile station MS (identification request). At the same time, other data may be transmitted to the mobile station MS; preferably, the WWW (World Wide Web) page of the subscriber database may be shown on the display of the mobile station. The required identification data, such as a PIN number, fed by the subscriber through the user interface, is transmitted from the mobile station to the subscriber database DB (identification). To achieve improved security, various subscriber authentication methods, such as public key techniques, may also be used between the subscriber database DB and the mobile station MS. Preferably, public key encryption may also be used to encrypt the connection between the mobile station and the subscriber database DB.

Subscriber data may be located in other places besides in the subscriber database DB. In particular, if a subscriber database owned by another mobile operator is to be used, the bearer network of the operator typically comprises a subscriber data register, such as an HLR register. If the subscriber database DB has accepted the subscriber identifier and the DB can be used, it is preferably activated in the home environment of the subscriber, i.e. in the bearer network DBNW that owns the DB. A connection is established from the subscriber database DB to the network DBNW, which typically owns the DB. The DB does not have to belong to the same network as the DBNW, whereby it may be necessary to perform DB authentication. The invention may also be applied in such a way that all necessary subscriber data are in the subscriber database, whereby the address of the network serving the subscriber is required from the subscriber database for connections to the mobile station.

If another mobile communication system is concerned, the DB may be authenticated according to the same principles as the USIM application in the mobile station. Hereby, authentication is performed between the subscriber database DB and its bearer network DBNW (authentication). The DB may comprise an IMSI identifier (or a TMSI identifier), on the basis of which the DB is identified. However, the IMSI identifier of the DB is only needed in the network, because the identifier of the USIM application is already in use between the mobile station MS and the serving network SN. The DBNW may compare the authentication response received from the subscriber database DB with the authentication response it has calculated itself.

If the necessary security procedures have been performed in an acceptable way between the subscriber, the subscriber database DB and its bearer network DBNW, the DB may be taken into use in the serving network. Information about the availability of the subscriber through the mobile switching centre MSC/VLR of the serving network is preferably set in the DBNW subscriber data of the network, preferably in the home location register HLR. The identifier of the subscriber database DB and other subscriber data, such as information about the allowed services (DB information), typically comprised by the home location register HLR, are transmitted from the network DBNW to the mobile switching centre MSC/VLR of the serving network. The identifier of the subscriber database DB to be transmitted may correspond to an IMSI or a TMSI identifier. Security procedures may be performed between the network DBNW and the serving network SN, and the DBNW may also transmit a confirmation to the serving network SN concerning the payment for the services to be provided. When needed, service logic may also be transmitted to the serving network SN, by means of the IN (Intelligent Network) technology, for example. The data required for the use of the subscriber database in the serving network are received from the DBNW, but it is also possible to transmit subscriber data directly from the subscriber database DB to the mobile switching centre MSC/VLR.

The MSC/VLR associates the DB identifier received with the IMSI or TMSI identifier of the USIM application in the mobile station MS. Hereby, the identifier of the USIM application is used in connections between the mobile station MS and the serving network SN, while the identifier of the DB is used in connections between the serving network and other networks, such as the bearer network DBNW. The DB identifier is associated with the USIM identifier, so that the MSC/VLR can direct data directed to the DB subscriber to the mobile station MS. In connections originating from the mobile station MS, the subscriber identifier is changed in the MSC/VLR to be consistent with the DB.

This means that the mobile station MS can be contacted on the basis of the MSISDN identifier (Mobile Subscriber International ISDN Number) of the subscriber database DB or the like identifier, typically through the network DBNW, but usually not on the basis of the MSISDN identifier of the USIM application. Preferably, the MSC/VLR separates the USIM application based connection to the mobile station from the connection according to the DB on the level of connection management, so that they can be billed for separately.

After the mobile switching centre MSC/VLR has been updated with the data of the subscriber database DB, the time limit that was preferably set previously can be removed. The mobile station may now utilize the services and data according to the subscriber database DB, while the serving network SN provides the radio connection. For instance, the subscriber may activate a voice service, for which the network DBNW will be billed.

It is necessary to update at least the address of the network serving the DB subscriber (SN information) at each particular time in the network DBNW, preferably in the home location register HLR. The location updating between the mobile station and the serving network SN can be performed by utilizing the USIM application in the mobile station according to prior art. According to a preferred embodiment of the invention, the MSC/VLR transmits, when needed, the information about the location of a subscriber to the network DBNW instead of the home location register HLR of the USIM application. If the mobile station is in connection with subscriber databases of various operators, multiple signalling over the radio interface may thus be avoided, for example in location updating, because the MSC/VLR preferably transmits the location information to the bearer networks of the different subscriber databases on the basis of the location updating of the USIM application. As the mobile station moves from the serving network SN to another network, the DB subscriber data comprised by the mobile switching centre MSC/VLR can be transmitted to the other network, whereby also information about the new network is naturally transmitted to the bearer network DBNW of the subscriber database.

The subscriber database and the mobile station being active, different subscriber data can be transmitted from the subscriber database DB to the mobile station MS (DB subscriber data). The data may comprise different service information about the services that the DB subscriber has the right to use. Also, subscriber database specific information, such as the subscriber identity (e.g. an IMSI identifier), of the DB may be transmitted to the mobile station. A subscriber's personal data, such as telephone numbers and stored messages, may be copied to the memory of the mobile station. Data may also be transmitted from the subscriber database to a value-added application comprised by the mobile station, such as to a banking transaction application.

The mobile station MS may modify the subscriber database DB data for which it has the right (MS data update). For instance, the mobile station MS may transmit the class of the mobile station (MS class) to the subscriber database DB. The data in the subscriber database are preferably updated by means of a separate WAP connection. The subscriber may easily process the DB data preferably by means of a WAP WWW micro browser. Subscriber data may preferably also be transmitted from the mobile station MS to the subscriber database DB, or vice versa, when another data transmission service, such as a voice service, is active.

It is to be noted that the above-described steps relating to the activation of the subscriber database DB may be in different order; for example, the DB may transmit data to the mobile station before the DBNW transmits subscriber data to the mobile switching centre MSC/VLR.

Figure 6:
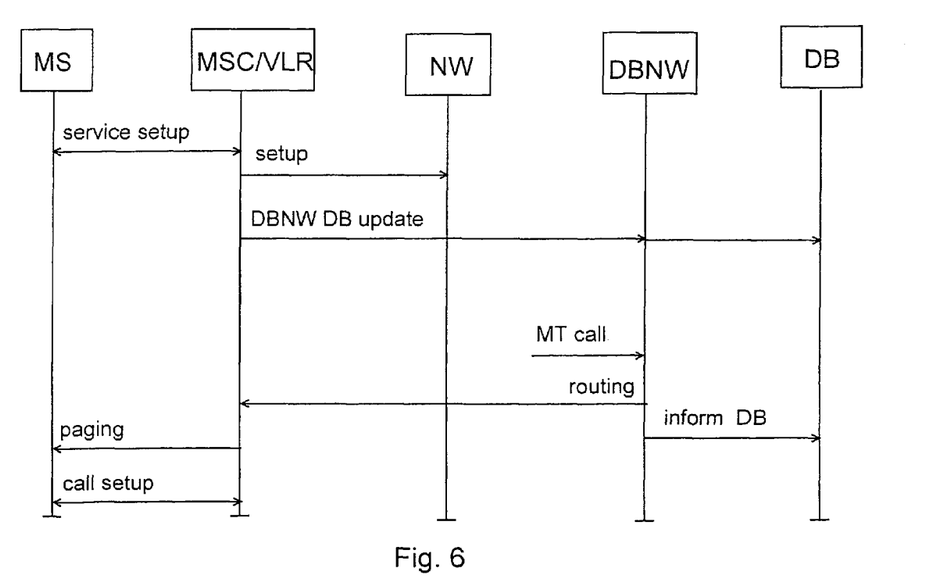
FIG. 6 illustrates, by way of example, implementation of a call activated from a mobile station and a call terminating in a mobile station by utilization of a subscriber database in the network.

In the following, a voice service activated from the mobile station MS is described with reference to FIG. 6 in a situation where a subscriber database DB located in the network is used. In addition to the voice service, also other services may also be activated and received in accordance with the subscriber database agreement and the support of the service network SN. Preferably, the DB is activated and the MSC/VLR updated in a manner described above.

The subscriber brings about the sending of the service request to the mobile switching centre MSC/VLR of the serving network. A connection is established between the mobile station and the mobile network in a manner known from the prior art, using a TMSI or an IMSI identifier of the USIM application, and the mobile station transmits the identifier of the party to be called to the MSC/VLR (service set-up). The possible security procedures are also performed at this stage, preferably by utilizing the USIM application. The MSC/VLR may also need parameters of the USIM application from the home location register HLR.

The MSC/VLR performs the connection establishment to the desired network NW (set-up). The connection establishment is preferably carried out in accordance with the subscriber data transmitted from the network DBNW to the mobile switching centre MSC/VLR. In order to identify the subscriber, an identifier according to the subscriber database DB is used in the network NW being the object of the connection. Subsequently, the call can be established between the mobile station and another terminal.

The MSC/VLR may also be in connection with the network DBNW (DBNW update). Data that are the same as those transmitted to the home environment of a call taking place during typical network roaming may also be transmitted to the network DBNW, for example location and billing information. For example information about the duration of the connection may also be transmitted to the subscriber database DB.

The DBNW may also attend to the provision of services, especially when services of the home environment are to be used. In such a case, the MSC/VLR can only provide the network connection to the network DBNW and see to the association of the identifier of the USIM application with the identifier according to the DB.

In the following, a voice call terminating in the mobile station MS is described further, with reference to FIG. 6, in a situation where a subscriber database DB located in the network is used. Preferably, the DB is activated and the mobile switching centre MSC/VLR of the serving network SN is updated with the subscriber data in the manner described above. Further, the MSC/VLR has transmitted the location information of the subscriber to the network DBNW.

On the basis of the MSISDN identifier of the DB or the like identifier, a call for the subscriber according to the subscriber database DB is directed to the network DBNW (MT call). The network DBNW receives the request and preferably checks the location of the subscriber from the home location register HLR. The DBNW transmits the call request to the mobile switching centre MSC/VLR of the serving network SN by using an IMSI or TMSI identifier of the DB (routing). The DBNW may also transmit information about the incoming call to the subscriber database DB (inform DB). This is not necessary, however, as the MSC/VLR attends to the actual connection establishment to the mobile station MS.

The MSC/VLR receives the call request and, on the basis of the above-described DB/USIM association, transmits the request to the mobile station MS according to the USIM application (paging). The MS receives the request and activates the functions required to receive the call. The connection is established between the mobile station and the MSCS/VLR (call setup), after which the call may be connected as the subscriber answers. As in the connection initiated by the mobile station, the MSC/VLR may transmit data to the network DBNW.

Since the home location register of the USIM application includes information stating that the subscriber is not in service, connections directed to a USIM subscriber will not, in general, be established through it. An exception could be call forwarding, by means of which a connection may be established to the subscriber by forwarding the call to the number according to the DB.

When the subscriber database DB is being activated, a cipher key may also be calculated for the mobile station. The cipher key is preferably calculated to encrypt the connection between the mobile station and the network DBNW. The cipher key is preferably be calculated according to the principles of the UMTS system during the authentication of the subscriber database DB. Hereby, the subscriber database calculates the cipher key by means of a random number parameter received from the network DBNW. If authentication is successful, the DB transmits the cipher key to the mobile station MS on a safe connection. The cipher key is preferably transmitted enciphered, so that only the mobile station MS is able to carry out the deciphering. The mobile station may thus use a cipher key in the enciphering of the data to be transmitted, and, in addition, enciphering according to the identifier application USIM may be in use over the radio path.

If the connection between the mobile station and the serving network is disconnected (and the mobile station is not served by another network), the subscriber data according to the subscriber database DB may be removed from both the mobile switching centre MSC/VLR and the mobile station.

In accordance with the example described above, several subscriber databases located in one or more networks may also be activated. Hereby, services of several different home environments may be utilized by means of the serving network. If the mobile station has several subscriber databases in use and in an activated state, information about the subscriber database to be used is preferably transmitted to the serving network when a service is activated.

The invention may be applied not only to mobile communication systems but also to other telecommunication systems. In the following, the establishment of a connection by means of the terminal through the Internet to a local area network LAN of a company by utilizing a subscriber database according to the invention is described by way of example.

In a terminal, such as a computer provided with a modem, a connection is established to an ISP (Internet Service Provider) network. The terminal comprises a subscriber identification application, which may be a telecommunication program provided by the ISP network, for example. Between the ISP and the terminal, the procedures required for the identification of the subscriber to the Internet connection, such as the checking of the password of the subscriber's user identifier, are carried out by utilizing the subscriber identification application. If the identification of the subscriber is successful, the connection may be established through the Internet to the address transmitted by the terminal.

The terminal is in possession of the IP address of the network element controlling the connection to the local area network LAN of a company. On the basis of the address, a connection is established to the network element comprising a subscriber database. The subscriber database receives a request for access to the LAN from the terminal, whereby it performs subscriber identification and checks subscriber rights. The subscriber identification may be performed by means of a digital signature transmitted by the terminal, for instance.

If the subscriber database identifies the subscriber, it preferably gives temporary access rights and an identifier to be used in the LAN. In addition to identification of the subscriber, the subscriber database preferably comprises various conditions for giving user identifiers. For example, a user identifier may be given if the LAN has less than 100 users. If there are more than 100 users, no user identifier will be given.

The user identifier and other data required may be transmitted from the subscriber database to the terminal, and it is thus necessary to ensure the security of the transmission, preferably by utilizing encryption. Hereby, data may be sent and received between the terminal and the LAN by means of the user identifier given. However, there may be another identifier for the identification of the terminal between the terminal and the ISP network providing the Internet connection.

It will be obvious to a person skilled in the art that as technologies develop further, the basic idea of the invention may be implemented in many different ways. The invention and its embodiments are therefore not limited to the examples described above but may vary within the scope of the claims.

The invention claimed is:

1. A method comprising:
   establishing a connection between a terminal and a subscriber database that stores subscriber data of a subscriber associated with the terminal and that is external to the terminal,
   where the subscriber data comprises personal data of the subscriber,
   where personal data of the subscriber comprises telephone numbers, stored messages, or data associated with value-added applications, and
   where data stored in the subscriber database is divided according to different file access rights such that the subscriber and an owner of the subscriber database have access rights to certain files, the subscriber only has access rights to certain other files, and the owner of the subscriber database only has access rights to certain other files;
   identifying during a communication using the established connection the subscriber associated with the terminal by using a subscriber identifier, where the communication contains an indication that another subscriber identifier is to be activated, where a particular subscriber identifier identifies the subscriber in a particular network;
   in response to determining that the subscriber is authorized to use another subscriber database that stores subscriber data, sending a subscriber identifier that is associated with the another subscriber database to the terminal;

modifying subscriber data stored in the another subscriber database in accordance with data received from the authorized subscriber; and permitting copying to a memory of the terminal telephone numbers, messages to the terminal, and data from the subscriber database to a value-added application comprised by the terminal.

2. The method of claim 1, further comprising transmitting subscriber data from the subscriber database to the terminal.

3. The method of claim 1, where subscriber data comprises service information concerning services that the subscriber has the right to use.

4. The method of claim 1, where subscriber data comprises subscriber database-specific information.

5. The method of claim 4, where the subscriber database-specific information is comprised of an international mobile subscriber identity.

6. The method of claim 2, where the subscriber data is transmitted to an application resident in the terminal.

7. The method of claim 1, further comprising enabling the subscriber to browse the subscriber data.

8. The method of claim 1, where establishing comprises receiving from the terminal an identification of a subscriber database to be used.

9. The method of claim 1, further comprising receiving from the terminal an address of a subscriber database to be used.

10. The method of claim 9, where the address is one of stored in the terminal or is inputted by the subscriber.

11. The method of claim 9, where the address is comprised of an internet protocol address.

12. The method of claim 1, where the subscriber database comprises subscriber data at least partly the same as subscriber data stored in a subscriber application that comprises part of the terminal.

13. The method of claim 1, further comprising: receiving location information of the terminal and transmitting data directed to the subscriber to a serving network on the basis of the location information.

14. An apparatus, comprising:
a processor; and
a memory including computer program code, where the memory and computer program code are configured to, with the processor, cause the apparatus at least to
establish a connection between a terminal and a subscriber database that stores subscriber data of a subscriber associated with the terminal and that is external to the terminal,
where the subscriber data comprises personal data of the subscriber,
where personal data of the subscriber comprises telephone numbers, stored messages, or data associated with value-added applications, and
where data stored in the subscriber database is divided according to different file access rights such that the subscriber and an owner of the subscriber database have access rights to certain files, the subscriber only has access rights to certain other files, and the owner of the subscriber database only has access rights to certain other files;
identify during a communication using the established connection the subscriber associated with the terminal by using a subscriber identifier, where the communication contains an indication that another subscriber identifier is to be activated, where a particular subscriber identifier identifies the subscriber in a particular network;
in response to a determination that the subscriber is authorized to use another subscriber database that stores subscriber data, send a subscriber identifier that is associated with the another subscriber database to the terminal;
modify subscriber data stored in the another subscriber database in accordance with data received from the authorized subscriber; and
permitting copying to a memory of the terminal telephone numbers, messages to the terminal, and data from the subscriber database to a value-added application comprised by the terminal.

15. The apparatus of claim 14, where the memory and computer program code are further configured, with the processor, to cause the apparatus to transmit subscriber data from the subscriber database to the terminal.

16. The apparatus of claim 14, where subscriber data comprises service information concerning services that the subscriber has the right to use.

17. The apparatus of claim 14, where subscriber data comprises subscriber database-specific information.

18. The apparatus of claim 17, where the subscriber database-specific information is comprised of an international mobile subscriber identity.

19. The apparatus method of claim 15, where the memory and computer program code are further configured, with the processor, to cause the apparatus to transmit the subscriber data to an application resident in the terminal.

20. The apparatus of claim 14, where the memory and computer program code are further configured, with the processor, to enable the subscriber to browse the subscriber data.

21. The apparatus of claim 14, where the memory and computer program code are further configured, with the processor, to cause the apparatus when establishing the connection to receive from the terminal an identification of a subscriber database to be used.

22. The apparatus of claim 14, where the apparatus receives an address of a subscriber database to be used.

23. The apparatus of claim 22, where the address is one of stored in the terminal or is inputted by the subscriber.

24. The apparatus of claim 22, where the address is comprised of an interne protocol address.

25. The apparatus of claim 14, where the subscriber database comprises subscriber data at least partly the same as subscriber data stored in a subscriber application that comprises part of the terminal.

26. The apparatus of claim 14, where the memory and computer program code are further configured, with the processor, to receive location information of the terminal and to transmit data directed to the subscriber to a serving network on the basis of the location information.

27. An apparatus, comprising:
a non-transitory memory medium reachable through a telecommunication system and storing a subscriber database associated with a subscriber,
where the subscriber data comprises personal data of the subscriber,
where personal data of the subscriber comprises telephone numbers, stored messages, or data associated with value-added applications, and
where data stored in the subscriber database is divided according to different file access rights such that the subscriber and an owner of the subscriber database have access rights to certain files, the subscriber only has access rights to certain other files, and the owner of the subscriber database only has access rights to certain other files;

the subscriber database storing subscriber data comprised of at least personal information associated with the subscriber and being at least partly editable by the subscriber via the telecommunication system, said subscriber database being responsive to receipt of a connection establishment request from a terminal of the subscriber to transmit a subscriber identification request to the terminal and, in response to verifying that the subscriber has the right to use the subscriber database, to transmit at least some of the personal information associated with the subscriber to the terminal; and permitting copying to a memory of the terminal telephone numbers, messages to the terminal, and data from the subscriber database to a value-added application comprised by the terminal.

28. The apparatus of claim 27, where subscriber data comprises service information concerning services that the subscriber has the right to use.

29. The apparatus of claim 27, where subscriber data comprises subscriber database-specific information.

30. The apparatus of claim 29, where the subscriber database-specific information is comprised of an international mobile subscriber identity.

31. A method, comprising:
providing a subscriber database associated with a subscriber, the subscriber database storing subscriber data comprised of at least personal information associated with the subscriber and being at least partly editable by the subscriber via the telecommunication system,
where the subscriber data comprises personal data of the subscriber,
where personal data of the subscriber comprises telephone numbers, stored messages, or data associated with value-added applications, and
where data stored in the subscriber database is divided according to different file access rights such that the subscriber and an owner of the subscriber database have access rights to certain files, the subscriber only has access rights to certain other files, and the owner of the subscriber database only has access rights to certain other files;

in response to receipt of a connection establishment request from a terminal of the subscriber, transmitting a subscriber identification request to the terminal;

in response to verifying that the subscriber has the right to use the subscriber database, transmitting at least some of the personal information associated with the subscriber to the terminal; and permitting copying to a memory of the terminal telephone numbers, messages to the terminal, and data from the subscriber database to a value-added application comprised by the terminal.

32. The method of claim 31, where data stored in the subscriber database is divided according to different file access rights such that the subscriber and an owner of the subscriber database have access rights to certain files, the subscriber only has access rights to certain other files, and the owner of the subscriber database only has access rights to certain other files.

33. The method of claim 31, where subscriber data comprises service information concerning services that the subscriber has the right to use.

34. The method of claim 31, where subscriber data comprises subscriber database-specific information.

35. The method of claim 34, where the subscriber database-specific information is comprised of an international mobile subscriber identity.

* * * * *

UNITED STATES PATENT AND TRADEMARK OFFICE
CERTIFICATE OF CORRECTION

PATENT NO. : 9,584,604 B2  Page 1 of 1
APPLICATION NO. : 10/082348
DATED : February 28, 2017
INVENTOR(S) : Pasi Laurila and Juha Timonen It is certified that error appears in the above-identified patent and that said Letters Patent is hereby corrected as shown below:

In Claim 24:
Column 16, Line 46, "interne" should be deleted and --internet-- should be inserted.

Signed and Sealed this
Eighteenth Day of April, 2017

Michelle K. Lee
*Director of the United States Patent and Trademark Office*